April 11, 1933.  E. R. MAURER ET AL  1,903,529
DROP CENTER DELIVERY VEHICLE
Filed Aug. 1, 1929
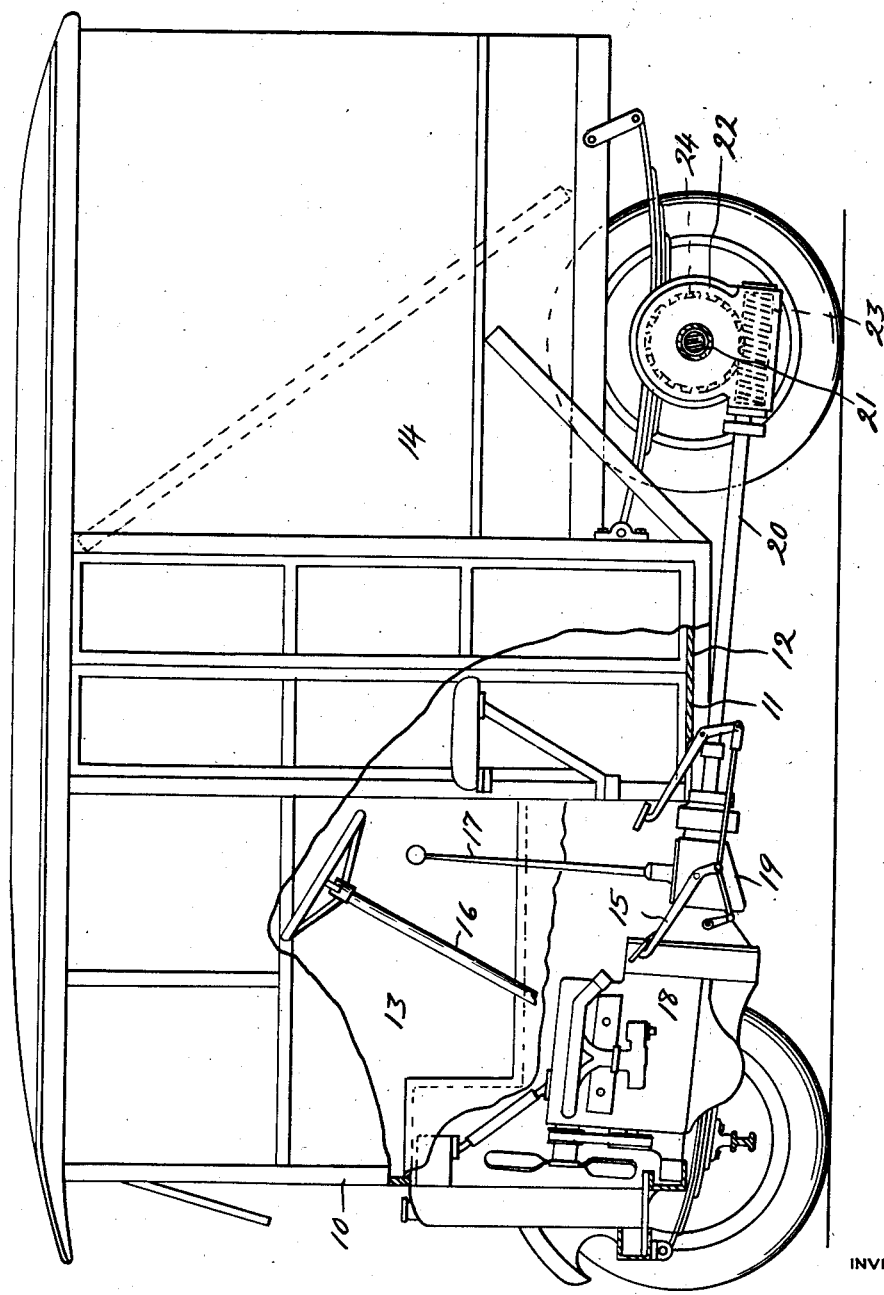
INVENTORS
Edwin R. Maurer
Donald M. Ferguson
BY
Whittemore Hulbert Whittemore
 + Belknap  ATTORNEYS Patented Apr. 11, 1933

1,903,529

UNITED STATES PATENT OFFICE

EDWIN R. MAURER, OF DETROIT, AND DONALD M. FERGUSON, OF HIGHLAND PARK, MICHIGAN, ASSIGNORS, BY MESNE ASSIGNMENTS, TO CONTINENTAL-DIVCO COMPANY, OF DETROIT, MICHIGAN, A CORPORATION OF MICHIGAN

DROP CENTER DELIVERY VEHICLE

Application filed August 1, 1929. Serial No. 382,819.

This invention relates to motor delivery vehicles and has particular reference to vehicles of this type designed for use in house to house deliveries.

This application is a continuation in part of our co-pending application Serial No. 325,079, filed December 10, 1928.

It is one of the objects of this invention to obtain a delivery vehicle construction which permits of using the standard construction of motor and motor vehicle controls and which at the same time provides an unobstructed aisle extending transversely through the vehicle and provided with a floor depressed to substantially curb level giving a standing height clearance beneath a vehicle top of ordinary height. By virtue of the unobstructed passage, the operator is permitted to readily enter and leave the vehicle from either side and to control the same while he is in a standing position within the passage.

With the foregoing, as well as other objects in view, the invention consists in the peculiar construction and arrangement of parts which will be more fully hereinafter described, especially when considered in connection with the accompanying drawing wherein the vehicle embodying our invention is shown diagrammatically in sectional elevation.

One of the outstanding problems to be solved in designing a motor delivery vehicle having a cross aisle depressed to substantially curb level is to provide means for transmitting power from the motor to the axle without interference with or obstruction of the cross aisle, and moreover, to accomplish this result without departing remotely from standard practice.

We have accomplished the foregoing result by the use of a propeller transmission shaft which is inclined downwardly as it passes to the rear so as to provide clearance beneath the passage floor. Also by the use of a drop gearing beneath the rear axle and the propeller shaft so that the latter may be placed in the lowest position consistent with leaving proper road clearance.

Referring now more in detail to the illustrative embodiment of the invention as shown in the drawing, it will be noted that there is illustrated a composite body and chassis 10 having a substantially centrally arranged passage 11 extending transversely of the vehicle and provided with a floor portion 12 depressed to substantially curb level giving a standing height clearance at every point throughout the passage. Arranged upon opposite sides of the passage so as to be conveniently accessible from a position in the latter are the compartments 13 and 14. Arranged within the compartment 13 are the vehicle controls including a combined clutch and brake actuating pedal 15, a steering wheel 16, and a transmission control element 17. All of the aforesaid control elements are so arranged within the compartment 13 as to be readily accessible from a standing position in the passage 11, thereby rendering it possible for the operator to control the vehicle from the passage 11 when making house to house deliveries.

With the construction as thus far described, it will be apparent that delivery is greatly facilitated due to the fact that the vehicle may be readily moved from house to house while the operator is in standing position and in convenient proximity to the load from which delivery is made. Also the fact that the operator is permitted to enter or leave the vehicle through the door openings on either side of the body at substantially curb level, and that the cross aisle is unobstructed still further facilitates quick delivery.

In order to render the foregoing construction possible and at the same time provide an efficient and practical driving mechanism for the vehicle, we provide the following arrangement. The motor 18 is carried in any suitable manner by the body in advance of the passage 11 and is provided with a transmission 19 of any suitable construction. The axis of the transmission and motor shaft are inclined downwardly and rearwardly and are operatively connected to the propeller shaft 20 for transmitting power to the rear driving axle 21. The propeller shaft is also inclined to a corresponding degree and passes beneath the floor 12.

Owing to the inclination of the propeller shaft, the rear end of the latter terminates a considerable distance below the axis of the rear driving axle, and accordingly some means must be provided for operatively connecting the propeller shaft to the rear driving axle. We have accomplished this by providing drop-down gearing 22 which comprises a worm 23 and a worm wheel 24 arranged in intermeshing relation upon the propeller and rear axle shafts 20 and 21 respectively.

Thus from the foregoing it will be apparent, that we have provided a practical and efficient drive for delivery vehicles of the type illustrated herein which does not interfere with or obstruct the depressed passage 11 in any way. Moreover, we have provided a driving mechanism which does not depart radically from standard practice and one that may be expeditiously manufactured, assembled, and installed.

What we claim as our invention is:

1. A motor delivery vehicle having in combination, a body formed with an unobstructed transversely extending passage depressed to substantially curb level, driving means for the vehicle including, an axle connected to the body in rear of the passage and having its axis approximately at the floor level of the passage, a motor carried by the body in advance of the passage and having its crank shaft arranged above the level of the passage floor, and a propeller shaft in substantial alignment with said crank shaft and axle passing beneath the floor of the passage and operatively connecting the motor shaft and axle.

2. A motor delivery vehicle having in combination, a body formed with a storage compartment and an unobstructed transversely extending passage adjacent to the storage compartment having a floor depressed to substantially curb level, driving means for the vehicle including, an axle located beneath the storage compartment and having its axis positioned approximately along the level of the floor for the passage, a motor carried by the body in advance of the passage and having its crank shaft arranged above the floor level of the passage, a propeller shaft operatively connected to the motor shaft and extending rearwardly therefrom in substantial alignment with said motor shaft beneath the floor of the passage and terminating at a point spaced below the axle aforesaid, and gearing operatively connecting said propeller shaft to the axle.

3. A motor delivery vehicle having in combination, a body formed with a driver's compartment and an unobstructed transversely extending passage adjacent to the driver's compartment having a floor depressed to substantially curb level, the floor of the passage and the driver's compartment being so arranged with respect to each other as to permit the operator to control the vehicle while standing erect in the passage, a rear driving axle for the vehicle spaced rearwardly from the passage and having its axis disposed approximately at the floor level of the passage, a motor carried by the body in advance of the passage and having its crank shaft spaced above the floor level of the passage and inclined downwardly and rearwardly, a propeller shaft operatively connected to the motor shaft and inclined in a corresponding direction to extend in substantial alignment therewith beneath the floor aforesaid of the passage, and means operatively connecting the propeller shaft to the rear axle for driving the latter.

4. A delivery vehicle comprising a chassis frame, wheels carried by the front and rear portions of said frame having their axes below the level of said frame, said frame having a dropped portion intermediate said front and rear wheels forming a low level through aisle, a closed body structure associated with said chassis frame having a top spaced from said aisle forming standing height clearance, an internal combustion engine carried by said frame in front of said aisle, a driving axle in rear of said aisle and a propeller shaft aligned with said engine and connecting said engine and axle and arranged below said aisle.

5. A delivery vehicle comprising a chassis frame, wheels carried by the front and rear portions of said frame having their axes below the level of said frame, said frame having a dropped portion intermediate said front and rear wheels forming a low level through aisle, a closed body structure associated with said chassis frame having a top spaced from said aisle forming standing height clearance, an internal combustion engine carried by said frame in front of said isle having its crank shaft spaced above the floor level of the passage and inclined downwardly and rearwardly, a propeller shaft in substantial alignment with said crank shaft extending beneath the floor of said aisle and a driving axle connected to said propeller shaft in rear of said aisle.

6. In a vehicle of the house-to-house delivery type, the combination of a chassis structure formed with a dropped portion intermediate the length thereof to provide a low level substantially unobstructed aisle transversely of the vehicle, front and rear axles extending transversely below the opposite ends respectively of said chassis, ground wheels carried by said axles, the front ground wheels being adapted for steering and the rear wheels for driving the vehicle, an internal combustion engine supported forwardly of said chassis closely adjacent the front axle, said engine being inclined rearwardly and downwardly, a body structure associated with said chassis, said body having side door openings above said dropped portion to provide standing height clearance for the operator in said aisle, said body enclosing said aisle and being provided with a storage space rearwardly of the aisle above said rear axle, a driving transmission rearwardly of said engine but forwardly of said aisle, vehicle steering means together with transmission controlling means positioned for operation by the driver of the vehicle when standing in the aisle, said aisle forming a single step approach to the vehicle for the driver, a propeller shaft aligned with the engine and transmission extending downwardly and rearwardly therefrom beneath said aisle to said rear axle, and a drop gearing between the rear axle and the rear end of the propeller shaft, the front end of said propeller shaft being positioned closely adjacent the forward portion of said aisle.

7. In a vehicle of the house-to-house delivery type, the combination of a chassis structure formed with a dropped portion intermediate the length thereof to provide a low level substantially unobstructed aisle transversely of the vehicle, front and rear axles extending transversely below the opposite ends respectively of said chassis, ground wheels carried by said axles, the front ground wheels being adapted for steering and the rear wheels for driving the vehicle, an internal combustion engine supported forwardly of said chassis closely adjacent the front axle, said engine being inclined rearwardly and downwardly, a body structure associated with said chassis, said body having side door openings above said dropped portion to provide standing height clearance for the operator in said aisle, said body enclosing said aisle and being provided with a storage space rearwardly of the aisle above said rear axle, a driving transmission rearwardly of said engine but forwardly of said aisle, vehicle steering means together with transmission controlling means positioned for operation by the driver of the vehicle when standing in the aisle, said aisle forming a single step approach to the vehicle for the driver, and a propeller shaft aligned with the engine and transmission extending downwardly and rearwardly therefrom beneath said aisle to said rear axle, the front end of said propeller shaft being positioned closely adjacent the forward portion of said aisle.

8. In a vehicle of the house-to-house delivery type, the combination of a chassis structure formed with a dropped portion intermediate the length thereof to provide a low level substantially unobstructed aisle transversely of the vehicle, front and rear axles extending transversely below the opposite ends respectively of said chassis, ground wheels carried by said axles, the front ground wheels being adapted for steering and the rear wheels for driving the vehicle, an internal combustion engine supported forwardly of said chassis closely adjacent the front axle, said engine being inclined rearwardly and downwardly, a body structure associated with said chassis, said body having side door openings above said dropped portion to provide standing height clearance for the operator in said aisle, said body enclosing said aisle and being provided with a storage space rearwardly of the aisle above said rear axle, vehicle steering means together with transmission controlling means positioned for operation by the driver of the vehicle when standing in the aisle, said aisle forming a single step approach to the vehicle for the driver, and a propeller shaft aligned with the engine extending downwardly and rearwardly therefrom beneath said aisle to said rear axle, the front end of said propeller shaft being positioned closely adjacent the forward portion of said aisle.

9. In a vehicle of the house-to-house delivery type, the combination of a chassis structure formed with a dropped portion intermediate the length thereof to provide a low level substantially unobstructed aisle transversely of the vehicle, front and rear axles extending transversely below the opposite ends respectively of said chassis, ground wheels carried by said axles, the front ground wheels being adapted for steering and the rear wheels for driving the vehicle, an internal combustion engine supported forwardly of said chassis closely adjacent the front axle, said engine being inclined rearwardly and downwardly, a body structure associated with said chassis, said body having side door openings above said dropped portion to provide standing height clearance for the operator in said aisle, said body enclosing said aisle and being provided with a storage space rearwardly of the aisle above said rear axle, vehicle steering means together with transmission controlling means positioned for operation by the driver of the vehicle when standing in the aisle, said aisle forming a single step approach to the vehicle for the driver, and a propeller shaft aligned with the engine extending downwardly and rearwardly therefrom beneath said aisle to said rear axle.

In testimony whereof we affix our signatures.

EDWIN R. MAURER.
DONALD M. FERGUSON.